(12) United States Patent
Christensen et al.

(10) Patent No.: US 11,132,110 B1
(45) Date of Patent: Sep. 28, 2021

(54) GRAPHICAL USER INTERFACES FOR MONITORING VIDEO CONFERENCES

(71) Applicant: Lenovo (Singapore) Pte. Ltd., Singapore (SG)

(72) Inventors: Tobias Christensen, San Francisco, CA (US); Axel Ramirez Flores, Cary, NC (US); Nathanial Albertson, Apex, NC (US); Matthew Fardig, Boonville, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/119,060

(22) Filed: Dec. 11, 2020

(51) Int. Cl.
| | |
|---|---|
| *H04N 7/15* | (2006.01) |
| *G06F 3/0484* | (2013.01) |
| *G06F 3/0482* | (2013.01) |
| *H04L 29/06* | (2006.01) |
| *G10L 15/18* | (2013.01) |

(52) U.S. Cl.
CPC .......... *G06F 3/0484* (2013.01); *G06F 3/0482* (2013.01); *H04N 7/15* (2013.01); *G10L 15/18* (2013.01); *H04L 65/403* (2013.01)

(58) Field of Classification Search
CPC ........ G06F 3/0484; G06F 3/0482; H04N 7/15
USPC .............................. 348/14.01–14.16; 715/752
See application file for complete search history.

(56) References Cited

U.S. PATENT DOCUMENTS

| | | |
|---|---|---|
| 9,113,032 B1 | 8/2015 | Mey et al. |
| 2016/0099986 A1* | 4/2016 | Bentley ............. G06F 16/24575 709/204 |
| 2018/0101760 A1* | 4/2018 | Nelson ................... G06Q 10/10 |
| 2019/0124128 A1* | 4/2019 | Bader-Natal ........ H04L 65/1093 |

OTHER PUBLICATIONS

"Natural Language Processing", Wikipedia, retrieved on Oct. 27, 2020 from https://en.wikipedia.org/wiki/Natural_language_processing.
"Sentiment analysis", Wikipedia, retrieved on Oct. 27, 2020, from https://en.wikipedia.org/wiki/Sentiment_analysis.
"Speech segmentation", Wikipedia, retrieved on Oct. 27, 2020 from https://en.wikipedia.org/wiki/Speech_segmentation.
(Continued)

*Primary Examiner* — Melur Ramakrishnaiah
(74) *Attorney, Agent, or Firm* — John M. Rogitz; John L. Rogitz

(57) ABSTRACT

In one aspect, an apparatus may include a processor and storage accessible to the processor. The storage may include instructions executable by the processor to present a graphical user interface (GUI) on a display. The GUI may include a first graphical object indicating data related to a first topic that is to be discussed by first and second participants of a first video conference, and the GUI may include a second graphical object indicating data related to a second topic that is to be discussed by third and fourth participants in a second video conference. The first and second video conferences may be transpiring concurrently. Additionally, the GUI may include a first selector that is selectable to allow a fifth participant to converse audibly in the first video conference, and a second selector that is selectable to allow the fifth participant to converse audibly in the second video conference.

20 Claims, 7 Drawing Sheets

(56) References Cited

OTHER PUBLICATIONS

"Text segmentation", Wikipedia, retrieved on Oct. 27, 2020 from https://en.wikipedia.org/wiki/Text_segmentation.
Christensen et al., "Graphical User Interfaces for Grouping Video Conference Participants", file history of related U.S. Appl. No. 17/119,225, filed Dec. 11, 2020.

* cited by examiner

GRAPHICAL USER INTERFACES FOR MONITORING VIDEO CONFERENCES

FIELD

The present application relates to technically inventive, non-routine solutions that are necessarily rooted in computer technology and that produce concrete technical improvements.

BACKGROUND

As recognized herein, there may be instances where a video conference group leader wishes to break the group up into sub-video conferences in order for smaller groups to perform tasks, work toward specific goals, discuss certain things, etc. As also recognized herein, current video conference systems fail to provide any adequate ways for the leader to track the different smaller groups at the same time. Thus, there are currently no adequate solutions to the foregoing computer-related, technological problem.

SUMMARY

Accordingly, in one aspect an apparatus includes at least one processor and storage accessible to the at least one processor. The storage includes instructions executable by the at least one processor to concurrently facilitate first and second video conferences, where the first video conference includes at least first and second participants and the second video conference includes at least third and fourth participants. The instructions are also executable to receive input from one or more sensors and, based on the input, monitor the participation of the first, second, third and fourth participants in their respective conferences. The instructions are then executable to present a graphical user interface (GUI) on a display based on the monitoring. The GUI indicates progress of the respective participants of the first and second video conferences in accomplishing a goal. Additionally, the GUI includes a first selector that is selectable to allow a fifth participant to converse audibly in the first video conference and a second selector that is selectable to allow the fifth participant to converse audibly in the second video conference. Thus, responsive to selection of the first selector, the instructions are executable to allow the fifth participant to converse audibly in the first video conference. Responsive to selection of the second selector, the instructions are executable to allow the fifth participant to converse audibly in the second video conference.

In some example embodiments, the apparatus may include a first device that performs the monitoring, and the apparatus may also include a second, different device that controls a display on which the GUI is presented.

Additionally, if desired the GUI may present a first graphical object indicating a status of the first video conference while the first video conference is ongoing, and the GUI may present a second graphical object indicating a status of the second video conference while the second video conference is ongoing.

Still further, in some example implementations the one or more sensors may include at least one microphone and the instructions may be executable to receive input from the at least one microphone, execute natural language processing using the input, and monitor the participation based on the execution of the natural language processing using the input. So, for example, the monitoring may include determining whether a designated topic is being discussed in each of the first and second video conferences, and the GUI may indicate whether the designated topic is being discussed in each of the first and second video conferences. As another example, the monitoring may include determining whether a particular topic has been discussed for at least a threshold period of time in the first video conference, and the GUI may indicate that the particular topic has been discussed for at least the threshold period of time in the first video conference. As yet another example, the monitoring may include determining whether one of the first and second participants is confused while participating in the first video conference, and the GUI may indicate that one of the first and second participants is confused responsive to the apparatus determining that one of the first and second participants is confused.

Still further, if desired in some example implementations the instructions may be executable to execute sentiment analysis based on the input from the one or more sensors and, responsive to determining a negative sentiment in at least one of the first, second, third, and fourth participants, present an indication of the negative sentiment on the GUI.

As another example, the instructions may be executable to determine that the first participant has been speaking for a greater length of time than the second participant during the first video conference based on the input from the one or more sensors. The GUI may thus present an indication that the first participant has been speaking for a greater length of time than the second participant during the first video conference. Additionally or alternatively, the instructions may be executable to store data indicating the first participant spoke for a greater length of time during the first video conference. Once the data is stored, the instructions may be executable to assign, based on the first participant speaking for a greater length of time during the first video conference, a participation rating to the first participant. The instructions may also be executable to present, based on the first participant speaking for a greater length of time during the first video conference, an indication that the first participant should be placed in a group to participate in a third video conference different from the first and second video conferences. The third video conference may begin at a time transpiring after conclusion of the first video conference.

In another aspect, a method includes providing a graphical user interface (GUI) that is presentable on a display. The GUI includes a first graphical object indicating data related to a first topic that is to be discussed by first and second participants of a first video conference. The GUI also includes a second graphical object indicating data related to a second topic that is to be discussed by third and fourth participants in a second video conference. The GUI further includes a first selector that is selectable to allow a fifth participant to converse audibly in the first video conference and a second selector that is selectable to allow the fifth participant to converse audibly in the second video conference. The method then includes allowing the fifth participant to converse audibly in the first video conference responsive to selection of the first selector, and allowing the fifth participant to converse audibly in the second video conference responsive to selection of the second selector.

In some examples, the first topic may be the same as the second topic.

Also in some examples, the first selector may be different from the second selector.

Still further, in various examples the method may be executed by one or more servers and/or one or more end-user devices.

Additionally, if desired the first graphical object may include a first progress bar indicating an amount of first sub-topics that have already been discussed in the first video conference, and the second graphical object may include a second progress bar indicating an amount of second sub-topics that have already been discussed in the second video conference.

Still further, in some example implementations the method may include concurrently facilitating the first and second video conferences, receiving input from one or more sensors, and monitoring the participation of the first, second, third and fourth participants in their respective video conferences based on the input. Then based on the monitoring the method may include providing the data related to the first topic that is to be discussed by the first and second participants of the first video conference and providing the data related to the second topic that is to be discussed by the third and fourth participants of the second video conference.

For example, the method may include monitoring, based on the input, written chat of at least the first participant as written by the first participant as part of the first video conference. The method may then include determining, from the written chat, one or more sentiments of the first participant in writing about the first topic. Thereafter the method may include presenting an indication, on the GUI, of the one or more sentiments.

In still another aspect, at least one computer readable storage medium (CRSM) that is not a transitory signal includes instructions executable by at least one processor to present a graphical user interface (GUI) on a display. The GUI includes a first graphical object indicating data related to a first topic that is to be discussed by first and second participants of a first video conference. The GUI also includes a second graphical object indicating data related to a second topic that is to be discussed by third and fourth participants in a second video conference. The first and second video conferences transpire concurrently. Additionally, the GUI includes a first selector that is selectable to allow a fifth participant to converse audibly in the first video conference, and a second selector that is selectable to allow the fifth participant to converse audibly in the second video conference. The instructions are then executable to allow the fifth participant to converse audibly in the first video conference responsive to selection of the first selector, and to allow the fifth participant to converse audibly in the second video conference responsive to selection of the second selector.

Thus, in some example implementations the instructions may be executable to monitor the participation of the first, second, third and fourth participants in their respective conferences based on input from one or more sensors. The instructions may then be executable to, based on the monitoring, present the data on the GUI related to the first topic that is to be discussed by the first and second participants of the first video conference and to concurrently present the data on the GUI related to the second topic that is to be discussed by the third and fourth participants of the second video conference.

The details of present principles, both as to their structure and operation, can best be understood in reference to the accompanying drawings, in which like reference numerals refer to like parts, and in which:

DETAILED DESCRIPTION

Figure 1:
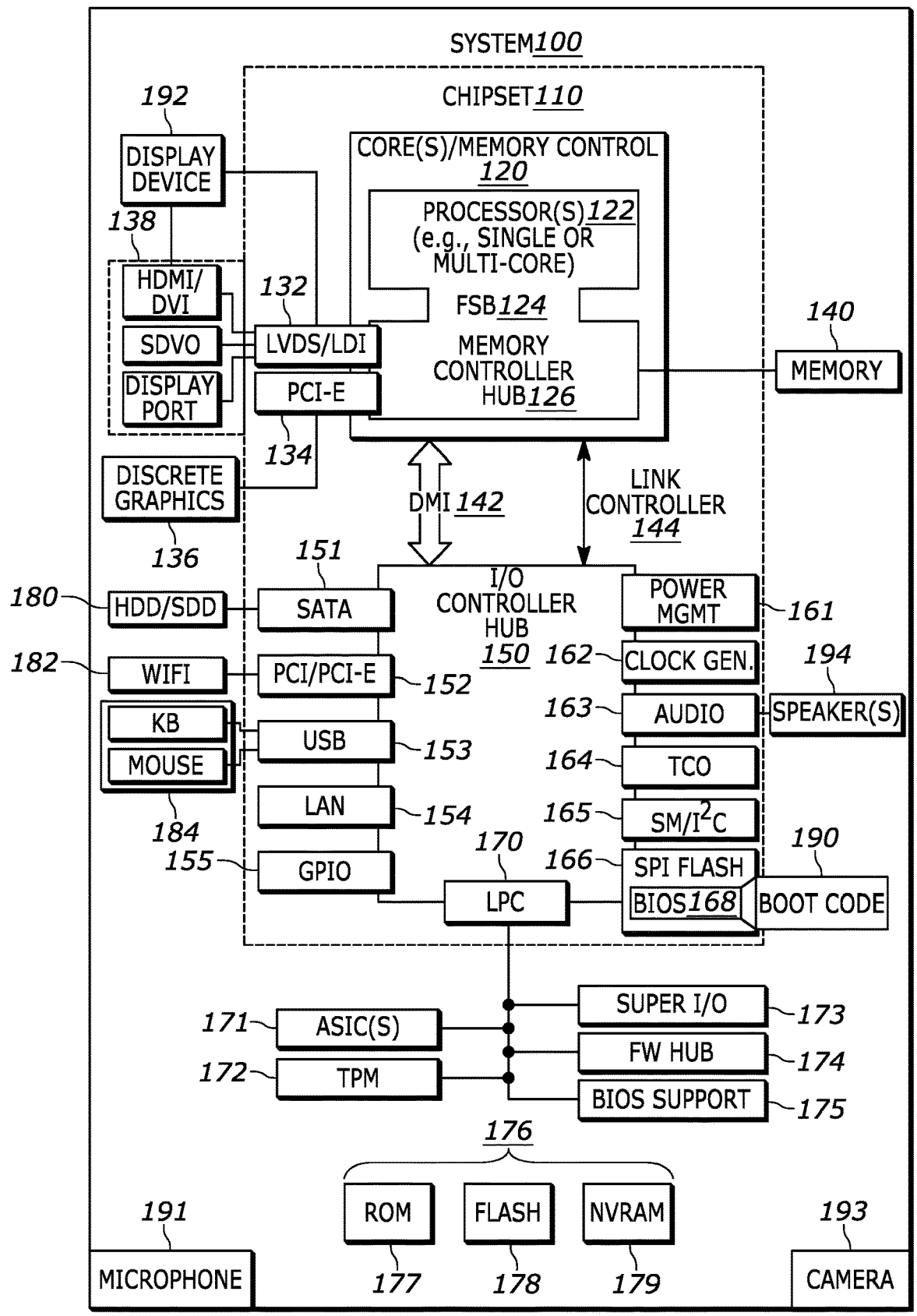
FIG. 1 is a block diagram of an example system consistent with present principles.

First note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone 191 to the processor 122 based on audio that is detected, such as via a user providing audible input to the microphone 191 as part of a video conference consistent with present principles. The system 100 may also include one or more cameras 193 that gather one or more images and provide the images and related input to the processor 122, such as for facilitating video conferencing consistent with present principles. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
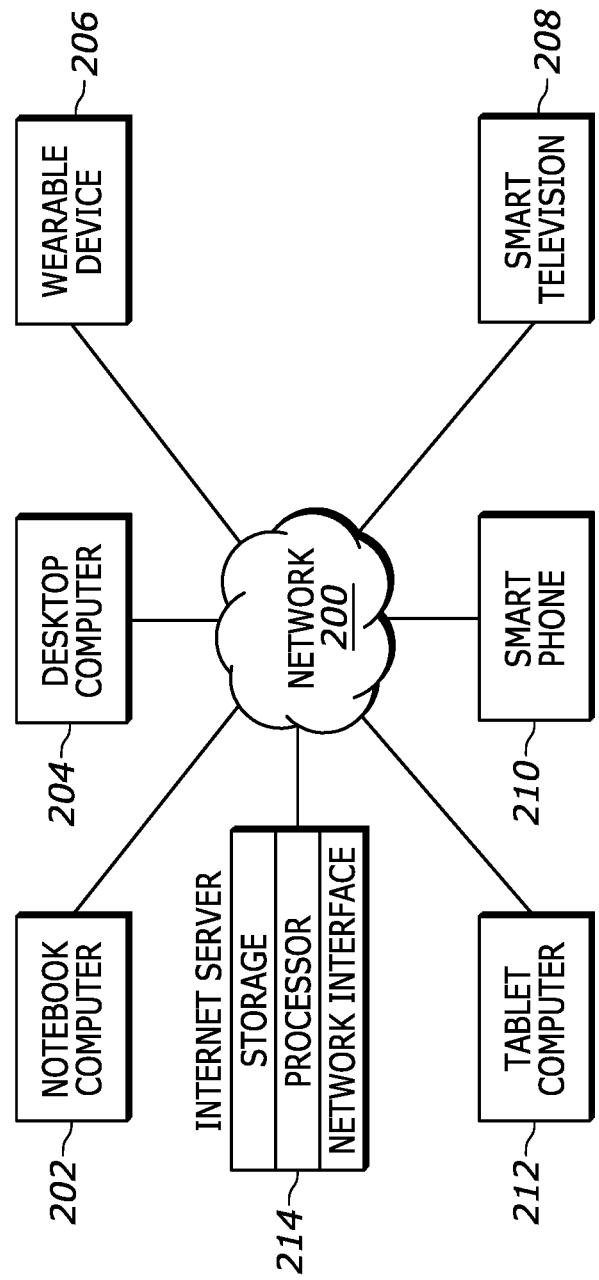
FIG. 2 is a block diagram of an example network of devices consistent with present principles.

Turning now to FIG. 2, example devices are shown communicating over a network 200 such as the Internet in accordance with present principles, such as for video conferencing. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
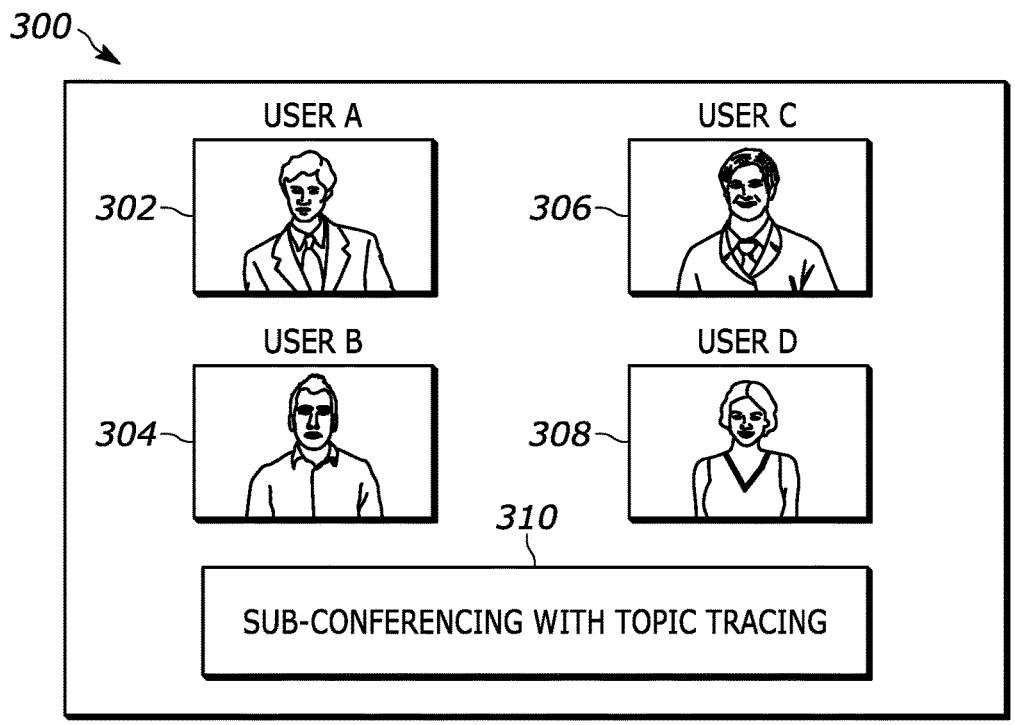
FIG. 3 shows an example graphical user interface (GUI) prior to a video conference being broken up into sub-conferences consistent with present principles.

Referring now to FIG. 3, it shows an example graphical user interface (GUI) 300 that may be presented on the display of an end-user's device such as the laptop computer or smartphone of a video conference organizer like a school teacher, teacher's assistant, project leader, company director, or another user e.g. with administrator privileges. Administrator privileges may be used, for example, to establish or change conference parameters and/or conference settings as will be described further below, while additional participants may for example merely have participation privileges to participate audibly and visually in video conferencing.

Thus, four additional participants beyond the organizer are also shown in FIG. 3 and are generally labeled User A, User B, User C, and User D. However, in other examples the actual first and last name of each respective participant may be presented. Additionally, note that while four participants are shown as an example, more or less participants may be included in the video conference.

As also shown in FIG. 3, the GUI 300 may include a respective real-time video feed 302-308 of the face of each participant while participating in the video conference. Further, consistent with present principles the GUI 300 may include a selector 310. The selector 310 may be selectable to initiate sub-conferencing of different sub-groups of the participants, where topic tracing and/or monitoring may be performed for the organizer to track progress of the participants in accomplishing a goal such as creating a written report, discussing a certain topic, collaborating on a project, etc. Accordingly, selection of the selector 310 may command the organizer's device to present the GUI 400 shown in FIG. 4. The organizer may then configure one or more parameters for sub-conferencing through the GUI 400.

Figure 4:
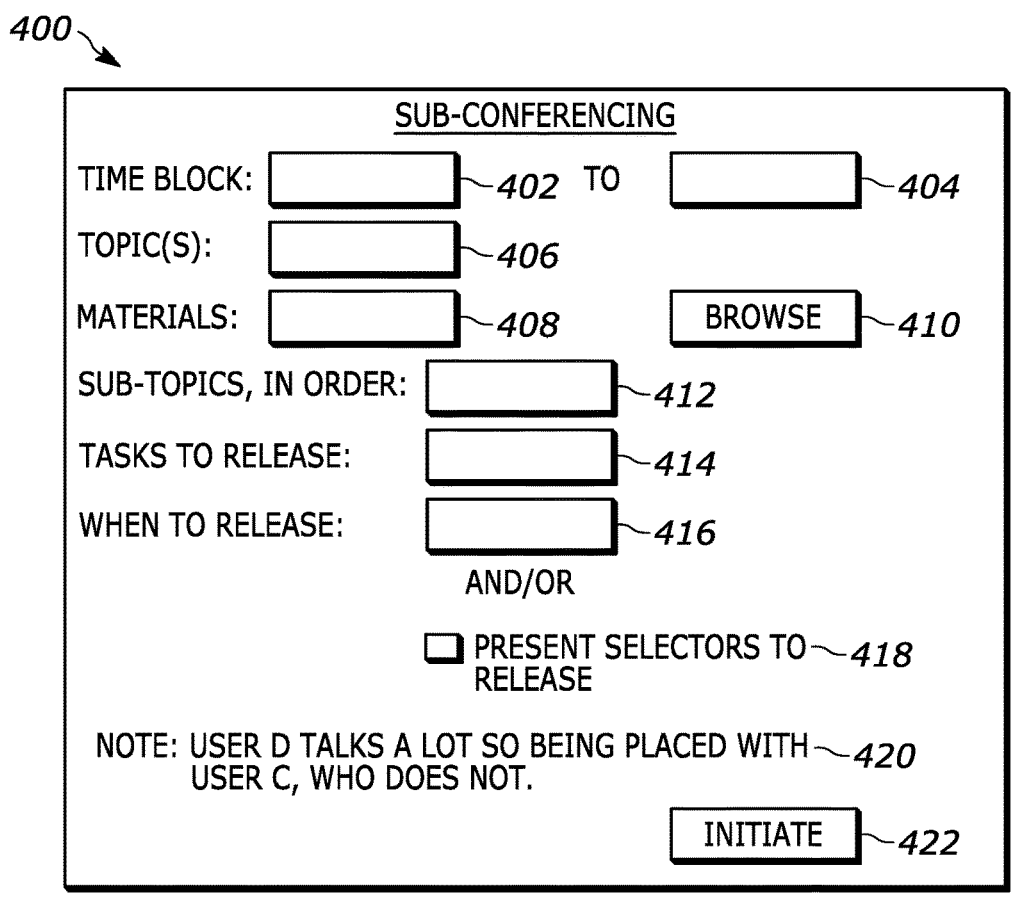
FIG. 4 shows an example GUI for specifying parameters for sub-conferencing consistent with present principles.

Thus, as shown in FIG. 4 the GUI 400 may include input fields 402 and 404 into which the organizer may enter a start time and end time, respectively, for the sub-conferences. As with other input fields discussed herein, entry may be performed using a hard or soft keyboard, voice commands, and other suitable methods of input.

The GUI 400 may also include an input field 406 into which an overall topic for discussion can be entered to designate that overall topic for discussion. Natural language processing (NLP) may then be executed by the organizer's device or a server in communication with that device to identify the overall topic from the words entered by the organizer into field 406 to ultimately monitor discussion of the topic in the sub-conferences as will be discussed later.

Additionally, if desired the GUI 400 may include an input field 408 into which one or more materials such as electronic documents, hyperlinks, messages, etc. can be entered for providing to the participants at a later time after the sub-conferences commence. A browse selector 410 may be selected if the organizer wishes to browse to a certain file location to select a file or folder to upload into electronic video conference system for such purposes. The name of the file or folder itself may then be indicated in the field 408.

Still further, the GUI 400 may include a sub-topics input field 412 into which one or more sub-topics for discussion can be entered (e.g., that each relate to the same overall topic) to designate those sub-topics for discussion. Again natural language processing may be executed by the organizer's device or a server in communication with that device to identify the sub-topic(s) for monitoring from the words entered into field 412 to ultimately monitor discussion of the sub-topic(s) in the sub-conferences as will be discussed later.

The GUI 400 may even include an input field 414 into which the organizer may enter one or more tasks for the participants that the organizer intends to release to the participants at various times during the sub-conferencing. Respective times for release may be entered into input field 416, and then natural language processing may be executed for the conferencing system to autonomously release the sub-topics at an appropriate time determined by the system based on the participant's discussion of an item determined to be related to the task(s). Additionally or alternatively, option 418 may be selected (by selecting the adjacent check box shown) for a selector to be presented on a GUI used for sub-conferencing for the organizer himself or herself to command the task be sent to one or more of the sub-conferences at a time deemed appropriate by the organizer. A GUI for sub-conferencing as mentioned in the preceding sentence will be discussed below in reference to FIG. 5.

However, first note in terms of FIG. 4 that the GUI 400 may further include one or more text indications 420 regarding previously-determined participation trends in various conference participants based on other conferences or sub-conferences that have transpired in the past. The indication(s) 420 may also indicate how the conferencing system, without specific input from the organizer, has autonomously divided the participants of the primary conference depicted in FIG. 3 for sub-conferencing. For example, the indication(s) 420 may indicate that User D talks a lot during video conferences and has therefore been placed with User C, who does not talk a lot during video conferences to thus create a balanced group for the sub-conferencing that includes both of those participants. Again note that more than two participants can be placed in each sub-conference and that only two participants will be discussed below for each sub-conference as an example.

As also shown in FIG. 4, once the organizer has entered input into one of more of the fields shown on the GUI 400 and is ready to begin the sub-conferencing, the organizer may select selector 422. Responsive to selection of selector 422, the conferencing system may break the participants up into sub-groups (e.g., as indicated in the indication 420) and initiate the sub-conferencing as shown in FIG. 5.

Figure 5:
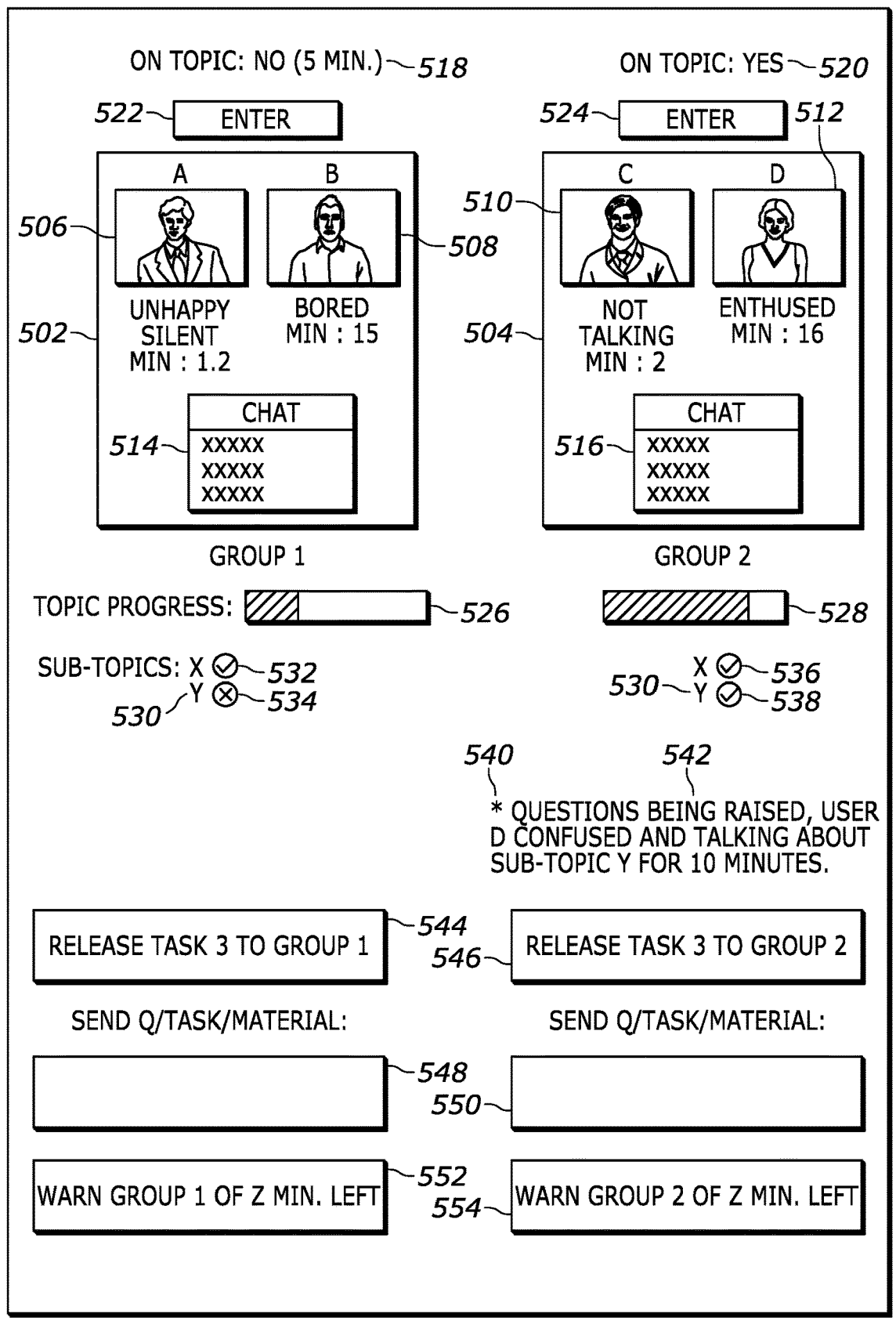
FIG. 5 shows an example GUI that may be presented on the display of a device of a conference organizer during sub-conferencing consistent with present principles.

Thus, attention will now be focused on FIG. 5, which shows an example GUI 500 that may be presented on the display of the organizer's device during the sub-conferencing. The GUI 500 may be presented for the organizer to track the sub-conferences and determine when he/she may wish to "check in" on a sub-conference by "entering" the sub-conference to audibly converse with the participants of that group and possibly also have the organizer's video feed presented to those other participants at their own respective devices. However, in other example embodiments the video feed of the organizer might always be shown to the participants of each sub-conference even though the organizer may elect "enter" one or the other of the sub-conferences for audible conversing and possibly text chatting as will be described further below. Also note that although sections for only two sub-conferences are shown, a respective section may be presented on the GUI 500 for each sub-conference that is concurrently transpiring even if greater than two.

In any case, as shown in FIG. 5 the GUI 500 may include sub-conferencing windows 502, 504 indicating respective thumbnail video streams 506-512 for the respective participants. The windows 502, 504 may also show a respective chat box 514, 516 showing a message chain of text message chatting between the respective participants of the respective sub-conferences.

One way in which the GUI 500 may indicate the progress or status of the respective participants so that the organizer can monitor the sub-conferences is by presenting graphical objects in the form of respective indications 518, 520. The indications 518, 520 may indicate whether the conversations of the respective participants are currently "on topic" (in that the participants of each sub-conference are discussing the overall topic specified by the organizer) or indicate if they are discussing something amongst themselves that is unrelated to the overall topic (such as the weather, a recent professional sporting event, etc.). As shown in FIG. 5, if the discussion of the participants of one of the sub-conferences is determined to be off-topic, the indication 518 may not only indicate as much but may also indicate the length of time that the conferencing system has determined the participants of that sub-conference to be off-topic (e.g., the length of time they discussed one or more other subjects).

Thus, should the organizer see that Group 1 is not on topic as in the present example, the organizer may select the enter selector 522 to virtually enter the first sub-conference. Upon entering, the organizer may at least converse audibly in the first sub-conference so that input to the organizer's microphone of the organizer speaking may be streamed to participants of the first sub-conference (but not participants of the second sub-conference). Real-time video of the organizer may continue to be streamed to the participants of both sub-conferences, or that video may only be streamed to participants of a sub-conference that the organizer has virtually entered via selection of the selector 522 (for the first sub-conference) or selector 524 (for the second sub-conference).

Additionally, note that in some examples virtually entering a respective sub-conference may also enable the organizer to engage in text chatting that would be included in the message chain indicated by the respective box 514, 516 so that other participants of the same sub-conference can see the organizer's text chat (while participants of the other sub-conference may not). Additionally, note that while the selectors 522, 524 are shown as being different from each other, in other examples a single toggle button may be presented to toggle between entering the two sub-conferences (e.g., where only two are concurrently ongoing).

Another way in which the GUI 500 may indicate the progress or status of the respective participants of the respective sub-conferences is by presenting graphical objects in the form of respective progress bars 526, 528. The bars 526, 528 may indicate respective amounts of the sub-topics (or overall topic) previously specified by the organizer that have been discussed and/or completed by the participants of the respective sub-conference. The amount of progress may be indicated via darker shading as shown where, in the present example, Group 1 has made less progress than Group 2 as represented by the shading in the respective bars 526, 528.

The designated sub-topics 530 themselves may also be listed on the GUI 500. As shown in FIG. 5, the designated sub-topics have been labeled "X" and "Y" in this example for simplicity, but it is to be understood that text listing the actual sub-topics may be listed instead as may have been specified by an organizer using the GUI 400 of FIG. 4. As shown in FIG. 5, the sub-topics 530 for each sub-conference are the same, but graphical objects 532-538 indicate the progress or status of the respective participants of the respective sub-conferences in discussing each respective sub-topic adjacent to the respective object 532-538.

In this case, the graphical objects 532-538 include green check marks or red "X"s within a circle to indicate whether the respective sub-topic adjacent to respective object 532-538 has been discussed (as determined by the system using natural language processing software and microphone input from each participant, for example). As shown in FIG. 5, while the graphical objects 532 and 536 indicate that both groups have discussed sub-topic "X", only Group 2 has discussed sub-topic "Y" (as indicated via the green-colored check mark 538) while Group 1 has not discussed sub-topic "Y" (as indicated via the red-colored "X" mark 534).

Additionally, note that in some examples the natural language processing and/or other software being executed by the system on the audio stream(s) of the sub-conference participants may be used to present still other graphical indications that indicate the progress or status of the respective participants in discussing the overall topic or respective sub-topic. For example, a non-text star icon 540 and text 542 may be presented for Group 2 to indicate that the participants of that group are raising questions about the overall topic or one of the sub-topics. As shown, the elements 540 and 542 may also be presented to indicate that User D seems confused based on what he/she is speaking, based on what he/she is writing in the chat box 516, and/or even based on how he/she looks as determined from the video feed for User D. As also shown in FIG. 5, the text 542 may indicate that User D has been talking about sub-topic "Y" for ten minutes, further demonstrating possible confusion on the part of User D. Note that other text may also be presented for Group 1 underneath the other graphical objects shown for Group 1, if applicable and depending on the results of the natural language understanding and/or sentiment analysis of Group 1.

Still referring to FIG. 5, as also shown the GUI 500 may include respective selectors 544, 546 for each sub-conference for the organizer to release a designated task to each respective sub-conference. The designated task may have been one entered into field 414 as described above in reference to FIG. 4, for example. However, again note that the designated task may also be released at a designated time or autonomously released by the conferencing system itself as also discussed above.

Additionally, if desired in some examples the GUI 500 may also include respective input fields 548, 550 for each sub-conference into which the organizer may enter questions to submit to the participants of the respective sub-conference. The fields 548, 550 may also be used to submit instructions for the participants to complete an additional task, to submit written material or other material for the participants to consider, etc.

Also if desired, the GUI 500 may include respective selectors 552, 554 that may be selectable to provide an audible and/or visual notification to the participants of the respective sub-conference that the participants only have a particular amount of time left for the sub-conference, which is generally designated "Z" in FIG. 5. However, note that the amount of time remaining may be dynamically determined based on an end time provided by the organizer and may be dynamically updated on the face of the respective selector 552, 554 as time progresses. Thus, responsive to selection of the selector 522 or 524, visual notifications may be presented on the respective GUIs for the participants of the respective sub-conference (as presented at each individual participant's device).

Figure 6:
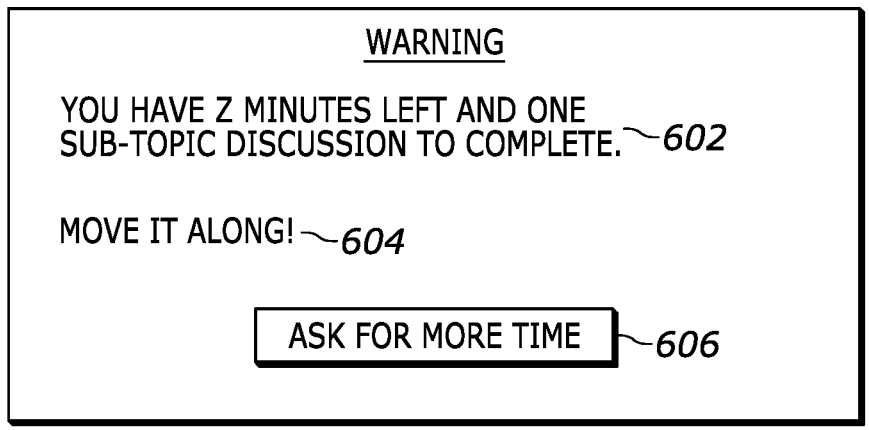
FIG. 6 shows an example warning message that may be presented on the display of a participant's device as part of sub-conferencing consistent with present principles.

An example of one of these visual notifications is shown in FIG. 6. As shown, a GUI 600 may be presented on the display of a respective participant's device, possibly overlaid on the video streams of the other respective participants of the same video sub-conference. The GUI 600 may include text 602 indicating that the participants have "Z" minutes remaining in which to participate in the sub-conference and an instruction 604 to "move it along" to complete all designated tasks and goals before the scheduled conclusion of the sub-conference. In some examples, the GUI 600 may even include a selector 606 that may be selectable to transmit a message to the device of the conference organizer to ask the conference organizer for more time to participate in the sub-conference if the respective participant believes more time beyond the scheduled conclusion would be helpful. The message transmitted to the organizer may then, for example, be overlaid on the GUI 500 as presented on the organizer's device.

Figure 7:
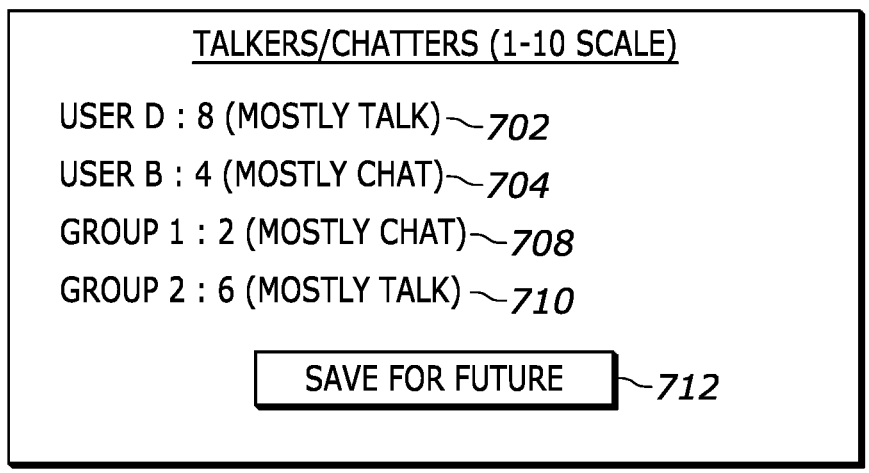
FIG. 7 shows various example participation ratings that may be been assigned to participants and groups based on the monitoring of conferences consistent with present principles.

Continuing the detailed description in reference to FIG. 7, it shows an example GUI 700 that may be presented on the display of the organizer's device responsive to conclusion of the sub-conferences. The GUI 700 may have been presented based on the conferencing system tracking the amount or duration that each respective participant participated in his/her respective sub-conference, either by speaking or by writing text chat. Each participant may be assigned a participation rating based on the tracking, and in this example the rating is based on a scale from one to ten where one is least active participation and ten is most active participation. Other scales may also be used, such as one to one hundred, or even a word-based scale such as "good participation", "some participation", and "no participation".

In any case, FIG. 7 shows that in this example, indication 702 indicates that User D has been assigned a participation rating of eight, with it being noted in parentheses that User D's participation was mostly by way of talking audibly during the conference. For User B in this example, indication 704 indicates that a participation rating of four has been assigned, with it being further noted that User B's participation was mostly in the form of text chatting during the sub-conference. Though not shown for simplicity, note that ratings and other data for Users A and C may also be presented on the GUI 700.

Additionally, if desired the GUI 700 may include collective participation ratings for each sub-conference itself, as may be determined for example by adding up the individual participation ratings of the participants of the respective sub-conference and then dividing that by the total number of participants in the respective sub-conference itself. As shown in FIG. 7, an indication 706 indicates that a collective participation rating of two has been assigned to Group 1, with it being further noted in parentheses that the participation of the respective participants was mostly through text chatting rather than audible conversing. As also shown in FIG. 7, an indication 708 indicates that a collective participation rating of six has been assigned to Group 2, with it being further noted in parentheses that the participation of the respective participants was mostly through audible conversing rather than text chatting.

Upon viewing the GUI 700, the organizer might decide that the ratings indicated on the GUI 700 should be saved for future use for the conferencing system to dynamically and autonomously create other conferences or sub-conferences in the future according to parameters the organizer might select at a later time. For example, using a GUI like the GUI 400 for a future conference to be broken up into sub-conferences, the organizer may wish to place talkative or high-participation people with other people assigned lower participation ratings for not talking (e.g., to create groups that are highly functional in order to allow each group a higher chance to succeed at the tasks it is given). As another example, the organizer may wish to place all high-participation people together and all low-participation people together in different groups (e.g., so that high-participation people learn how to share speaking time and low participation people become more engaged with each other). Other combinations might also be desired, including mixing in one mid-participation person for a sub-conference with a high-participation person and a low-participation person.

Figure 8:
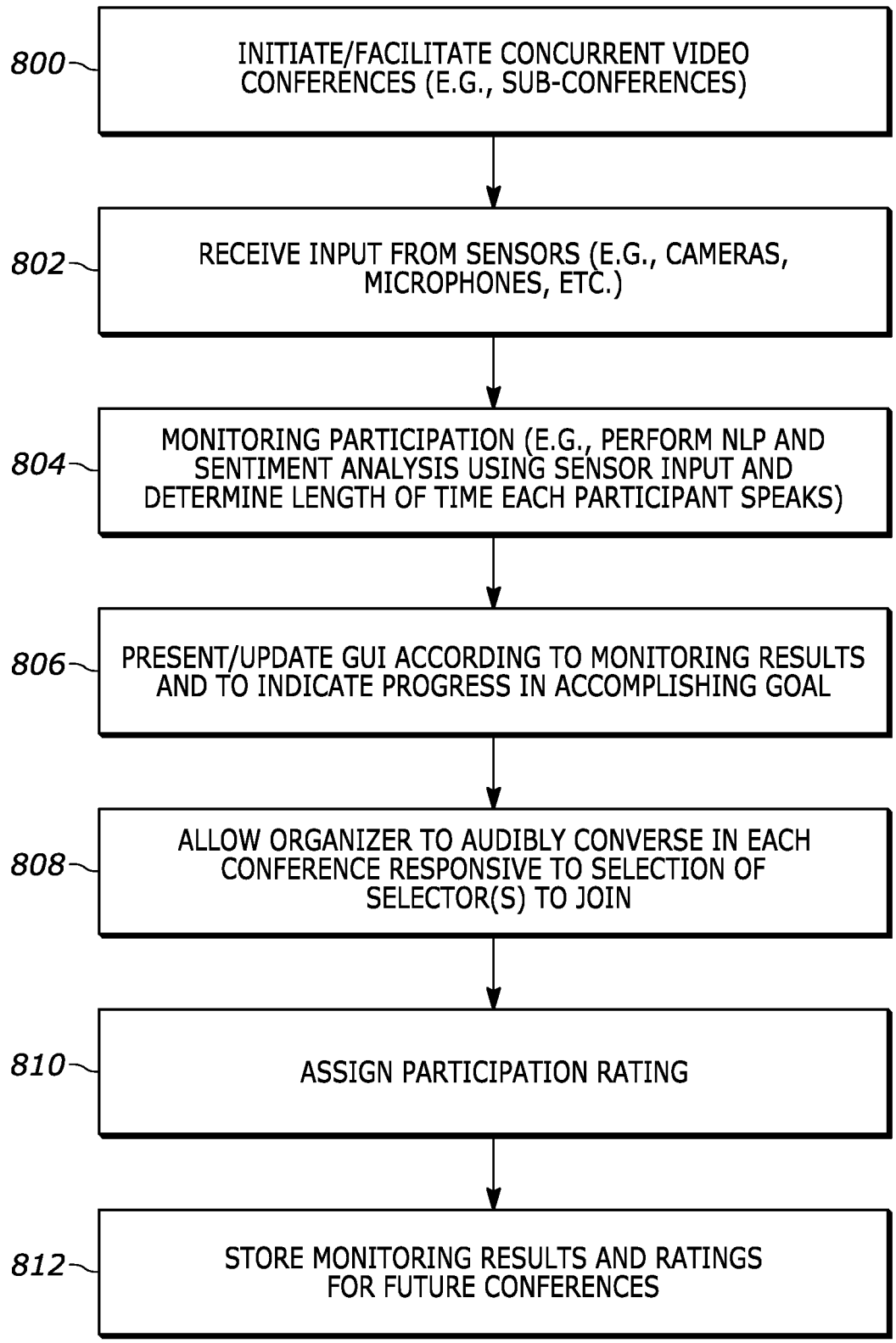
FIG. 8 shows a flow chart of an example algorithm that may be executed consistent with present principles.

Referring now to FIG. 8, it shows example logic consistent with present principles that may be executed by a device such as the system 100, a server hosting a conferencing system that facilitates conferencing and sub-conferencing, and/or a conference organizer's device (e.g., that might also host or facilitate the conferencing system). Thus, in some example implementations one or more of the steps of FIG. 8 may be executed by the server while other steps may be executed by the organizer's own personal device in any appropriate combination.

In any case, beginning at block 800 the device may initiate and/or facilitate two or more concurrent video conferences, such as concurrent sub-conferences as described above with respect to FIG. 5. The device of FIG. 8 may do so by taking a group list of all participants and assigning respective participants from the list to respective conferences as discussed herein while also informing the respective participants of their placement in a respective conference.

Initiating and/or facilitating two or more concurrent video conferences may also include receiving a respective audio stream detected by a microphone on a respective participant's device, receiving a respective video stream detected by a camera on the respective participant's device, and receiving respective text (e.g., for text chatting) provided using a keyboard on the respective participant's device. The device of FIG. 8 may then merge and route those streams to the other participants in real-time for presentation at the respective devices of the other participants.

From block 800 the logic may continue to block 802. At block 802 the device executing the logic of FIG. 8 may receive input from one or more sensors on one or more of the participants' devices, such as a microphone, keyboard, or camera on the respective participant's device. From block 802 the logic may then proceed to block 804.

At block 804 the device may use the input from the sensor(s) to monitor participation of each participant in the respective video conference or sub-conference to which he/she has been assigned. Thus, depending on input type, the device may execute one or more computer-based algorithms for monitoring participation. These might include execution of natural language processing (NLP) and sentiment analysis using audio input from each respective participant's microphone to determine one or more sentiments exhibited by the respective participant during his/her respective video conference (e.g., positive sentiments such as happy or excited, or negative sentiments such as sad, bored, angry, confused, etc.). Visual sentiment analysis and/or computer vision may also be executed based on input from each participant's camera to also determine sentiments exhibited by the respective participant visually (e.g., to gauge engagement, attention levels, and interests of individuals forming the conference or sub-conference).

Still in reference to block 804, participation may also be monitored in terms of topics or sub-topics discussed or to be discussed. To do so, NLP including text segmentation and topic segmentation may be executed using audio input from each participant's microphone to match speech indicated in the input with the overall topic or sub-topic to discern whether the group is talking about the topic/sub-topic or something different. NLP and audio input may also be used to detect questions the participants raise to determine whether they keep talking about the same topic (e.g., which could indicate they are stuck) or a different topic.

The device may also use an agenda provided by the organizer along with text segmentation and topic segmentation to make sure the participants stay on track and have time for all topics. This may be done, for example, so that the organizer can check whether topics have been covered via a GUI like the GUI 500 to then command the system to provide a reminder. Additionally or alternatively, the device may use NLP and topic analysis to autonomously remind the participants based on an average time it takes for the participants to discuss each topic or sub-topic that has been covered so far, the number of topics/sub-topics to discuss that remain, and a scheduled end time for the meeting. Thus, in some embodiments NLP and topic analysis/segmentation may be executed to ensure all topics are covered by the scheduled end time.

As still another example, at block 804 audio input may also be used along with an electronic timer and voice identification to determine a total length of time that a respective participant spoke during the conference, even if separated by periods during which other participants spoke. Additionally or alternatively, individual words spoken by each participant may be counted to render a word count total for each participant. Talking patterns may then be identified and used to determine which conferences or sub-conferences include the most or least talking among all participants and/or specific participants (e.g., by talk time and/or word count).

Also at block 804, if desired the device may access the participants' text chatting to detect an amount of written content by the participants. Thus, here too sentiment analysis may be executed (this time on the text of the text-based chat). In addition to tracking each participant's text-based chat for determining sentiments of each individual participant, the overall amount of text-based chat and the interaction patterns of that chat may also be monitored (e.g., to determine which participants interact or do not interact with other specific participants).

Still in reference to FIG. 8, from block 804 the logic may then proceed to block 806. At block 806 the device may present a GUI such as the GUI 500, and/or update the GUI in real-time if already presented as sentiments and other items discussed above are detected. Again note that the GUI may also indicate the conference or sub-conference's progress in accomplishing a goal, such as discussing a certain number of sub-topics related to the overall topic. After block 806 the logic may proceed to block 808.

At block 808 the device may allow the organizer to audibly converse in the conferences or sub-conferences at different times based on which conference or sub-conference the organizer "enters" as discussed above. Also note that at block 808 the organizer may enter a given conference or sub-conference to engage in text chatting and have his/her video feed transmitted to the participants of the respective conference/sub-conference.

In some examples, after block 808 the logic may then proceed to block 810. At block 810 the device may assign participation ratings to the participants of the respective conferences or sub-conferences and/or assign ratings to the conferences/sub-conferences as a whole if desired. Again the ratings may be based on the total length of time a participant (or conference) spoke or total number of words/sentences a participant (or conference) wrote.

Thus, general behavior of individual participants may be observed over a series of conferences, with a group and an individual ratings assigned and updated as more conferences transpire. In some examples, the rating for an individual participant or conference group may be based on the amount spoken combined with the overall progress of the group in accomplishing one or more goals so that, even if there might have been a lot of talking, a favorable participation rating will not be assigned if none of the goals were accomplished. The weights that are used by the device for weighting amount spoken against overall progress may be determined by a system administrator or even the conference organizer.

Additionally, if it has not already done so, at block 810 the device may determine domination by particular participants or a sub-group of participants of the conferences/sub-conferences that were being facilitated. For example, if only one or two participants talked or using text-based chat while others did not, the device might determine that the other participants were not participating or were not being included in the discussion by others in a way that would have allowed non-participating participants to actually participate. This might be useful for the organizer to know so the organizer can join/enter the conference/sub-conference and facilitate better interaction among the participants.

From block 810 the logic may then proceed to block 812. At block 812 the device may store the monitoring results from block 804 and data determined at block 810 (e.g., ratings) for use in the future, such as to break up a future conference into plural sub-conferences based on participation ratings for the individual participants as discussed herein (e.g., mixing a high-volume talker with a low-volume talker). Future use might also include an organizer checking in on conferences/sub-conferences with participants that have a history of being in poor-performing groups/conferences to help them.

Future use might also include the conferencing system continuing to monitor interaction in conferences and continuing to modify its assessment of the optimal way to detect progress in groups (e.g., weight NLP and audio input higher than visual sentiment analysis). This information can be used for later conferences by continually or periodically updating group and participant ratings as more conferences transpire to achieve an optimal group suggestion strategy to promote a level of interaction desired by the organizer.

Figure 9:
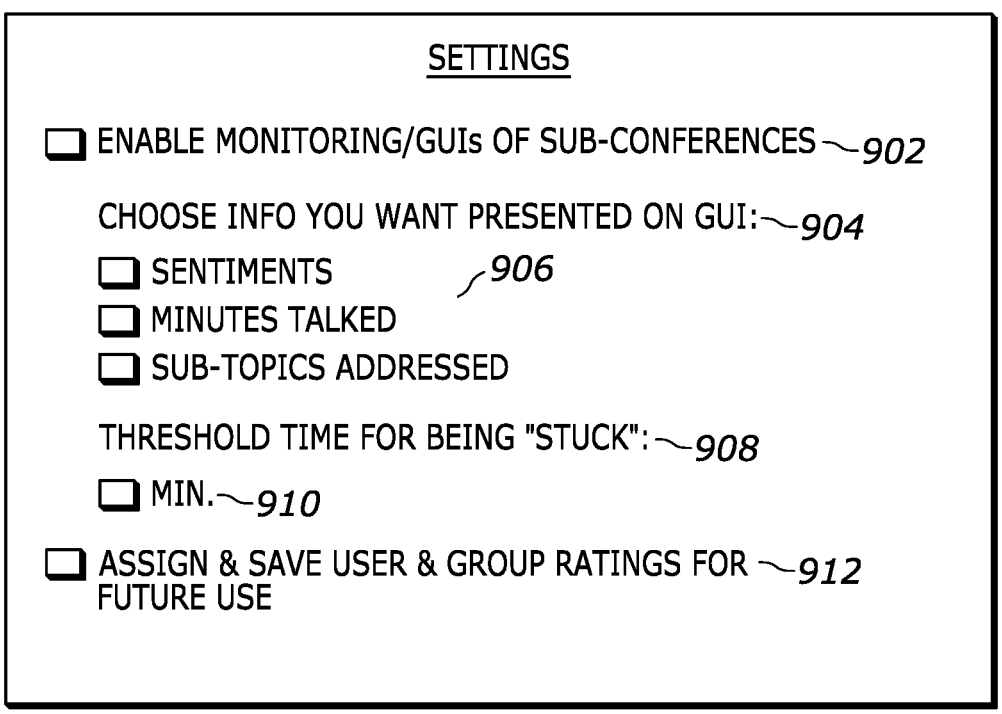
FIG. 9 shows an example GUI for configuring one or more settings of a conferencing system operating consistent with present principles.

Reference is now made to FIG. 9, which shows an example settings GUI 900 that may be presented on the display of a device for a conference organizer, a device of an administrator of the conferencing system itself, or the device of another person for configuring settings of the conferencing system. In the present example, each of the options to be discussed below may be selected by directing touch or cursor input to the respective check box adjacent to the respective options.

As shown in FIG. 9, the GUI 900 may include a first option 902 that may be selectable to set or configure the user's device and/or conferencing system to in the future undertake present principles, including for example monitoring participants and/or presenting a GUI showing the monitoring results (such as the GUI 500). So, for example, option 902 may be selected to set or enable the device or system to present the GUI 500, to undertake the actions described above in reference to the GUI 500, to execute the logic of FIG. 8, etc.

The GUI 900 may also include a section 904 at which one or more options 906 may be presented that may be respectively selectable to select various particular types of monitoring to perform and present, including the monitoring of sentiments, the monitoring of length of time each participant spoke, and the monitoring of sub-topics addressed. Any other types of monitoring disclosed herein may also be presented and it is to be understood that only those three are shown in FIG. 9 for simplicity.

As also shown in FIG. 9, the GUI 900 may include a section 908 at which the user may set a threshold amount of time during which a particular topic or sub-topic is discussed before the system determines that the participant or group is stuck on the topic and might be confused so that the conference organizer can then be notified that he/she might want to check in on the group. In this example, numerical input may be directed to input box 910 in order to establish the threshold as a particular number of minutes. Thus, for example, the text 542 discussed above may be presented responsive to a threshold amount of time being reached that was set via input box 910.

Still further, if desired the GUI 900 may include an option 912 that may be selectable to command the device or system to assign and save ratings assigned to individual conference participants as well as assigned to a conference/sub-conference group collectively for use in the future as discussed herein (e.g., to indicate to an organizer how people should be divided up into different groups in the future for other conferencing on a different topic).

It may now be appreciated that present principles provide for an improved computer-based user interface that increases the functionality and ease of use of the devices and electronic systems disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
    at least one processor; and
    storage accessible to the at least one processor and comprising instructions executable by the at least one processor to:
    concurrently facilitate first and second video conferences, the first video conference comprising at least first and second participants and the second video conference comprising at least third and fourth participants;
    receive input from one or more sensors;
    based on the input, monitor the participation of the first, second, third and fourth participants in their respective video conferences;
    based on the monitoring, present a graphical user interface (GUI) on a display, the GUI indicating progress of the respective participants of the first and second video conferences in accomplishing a goal, the GUI comprising a first selector that is selectable to allow a fifth participant to converse audibly in the first video conference, the GUI comprising a second selector that is selectable to allow the fifth participant to converse audibly in the second video conference;
    responsive to selection of the first selector, allow the fifth participant to converse audibly in the first video conference; and
    responsive to selection of the second selector, allow the fifth participant to converse audibly in the second video conference;
    wherein the one or more sensors comprise at least one microphone, and wherein the instructions are executable to:
    receive input from the at least one microphone;
    execute natural language processing using the input from the at least one microphone; and
    monitor the participation based on the execution of the natural language processing using the input from the at least one microphone.

2. The apparatus of claim 1, wherein the apparatus comprises a first device that performs the monitoring and wherein the apparatus comprises a second device that controls a display on which the GUI is presented, wherein the first device is different from the second device.

3. The apparatus of claim 1, wherein the monitoring comprises determining whether a designated topic is being discussed in each of the first and second video conferences, and wherein the GUI indicates whether the designated topic is being discussed in each of the first and second video conferences.

4. The apparatus of claim 1, wherein the monitoring comprises determining whether a particular topic has been discussed for at least a threshold period of time in the first video conference, and wherein the GUI indicates that the particular topic has been discussed for at least the threshold period of time in the first video conference.

5. The apparatus of claim 1, wherein the monitoring comprises determining whether one of the first and second participants is confused while participating in the first video conference, and wherein the GUI indicates that one of the first and second participants is confused responsive to the apparatus determining that one of the first and second participants is confused.

6. The apparatus of claim 1, wherein the instructions are executable to:
    based on input from one or more of the one or more sensors, determine that the first participant has been speaking for a greater length of time than the second participant during the first video conference.

7. The apparatus of claim 6, wherein the GUI presents an indication that the first participant has been speaking for a greater length of time than the second participant during the first video conference.

8. The apparatus of claim 6, wherein the instructions are executable to:
    store data indicating the first participant spoke for a greater length of time during the first video conference; and
    one or more of:
        assign, based on the first participant speaking for a greater length of time during the first video conference, a participation rating to the first participant; and/or
        present, based on the first participant speaking for a greater length of time during the first video conference, an indication that the first participant should be placed in a group to participate in a third video conference different from the first and second video conferences, wherein the third video conference begins at a time transpiring after conclusion of the first video conference.

9. The apparatus of claim 1, wherein the GUI comprises a first progress bar indicating an amount of first topics that have already been discussed in the first video conference, and wherein the GUI comprises a second progress bar indicating an amount of second topics that have already been discussed in the second video conference.

10. A method, comprising:
    providing a graphical user interface (GUI) that is presentable on a display, the GUI comprising a first graphical object indicating data related to a first topic that is to be discussed by first and second participants of a first video conference, the GUI comprising a second graphical object indicating data related to a second topic that is to be discussed by third and fourth participants in a second video conference, the GUI comprising a first selector that is selectable to allow a fifth participant to converse audibly in the first video conference, the GUI comprising a second selector that is selectable to allow the fifth participant to converse audibly in the second video conference;
    responsive to selection of the first selector, allowing the fifth participant to converse audibly in the first video conference; and
    responsive to selection of the second selector, allowing the fifth participant to converse audibly in the second video conference;
    wherein the first graphical object comprises a first progress bar indicating an amount of first sub-topics that have already been discussed in the first video conference, and wherein the second graphical object comprises a second progress bar indicating an amount of second sub-topics that have already been discussed in the second video conference.

11. The method of claim 10, wherein the method comprises:
  concurrently facilitating the first and second video conferences;
  receiving input from one or more sensors;
  based on the input, monitoring the participation of the first, second, third and fourth participants in their respective video conferences; and
  based on the monitoring:
    providing the data related to the first topic that is to be discussed by the first and second participants of the first video conference; and
    providing the data related to the second topic that is to be discussed by the third and fourth participants of the second video conference.

12. The method of claim 11, wherein the method comprises:
  monitoring, based on the input, written chat of at least the first participant as written by the first participant as part of the first video conference;
  determining, from the written chat, one or more sentiments of the first participant in writing about the first topic; and
  presenting an indication, on the GUI, of the one or more sentiments.

13. The CRSM of claim 12, wherein the first graphical object comprises a first progress bar indicating an amount of the first topic that has already been discussed in the first video conference, and wherein the second graphical object comprises a second progress bar indicating an amount of the second topic that has already been discussed in the second video conference.

14. The method of claim 10, comprising:
  receiving input from at least one microphone;
  executing natural language processing using the input from the at least one microphone; and
  monitoring participation of the first, second, third, and fourth participants in their respective video conferences based on the execution of the natural language processing using the input from the at least one microphone.

15. The method of claim 10, comprising:
  based on input from one or more sensors, determining that the first participant has been speaking for a greater length of time than the second participant during the first video conference.

16. The method of claim 15, wherein the GUI presents an indication that the first participant has been speaking for a greater length of time than the second participant during the first video conference.

17. The CRSM of claim 10, wherein the instructions are executable to:
  based on input from the one or more sensors, determine that the first participant has been speaking for a greater length of time than the second participant during the first video conference.

18. The CRSM of claim 17, wherein the GUI presents an indication that the first participant has been speaking for a greater length of time than the second participant during the first video conference.

19. At least one computer readable storage medium (CRSM) that is not a transitory signal, the computer readable storage medium comprising instructions executable by at least one processor to:
  present a graphical user interface (GUI) on a display, the GUI comprising a first graphical object indicating data related to a first topic that is to be discussed by first and second participants of a first video conference, the GUI comprising a second graphical object indicating data related to a second topic that is to be discussed by third and fourth participants in a second video conference, the first and second video conferences transpiring concurrently, the GUI comprising a first selector that is selectable to allow a fifth participant to converse audibly in the first video conference, the GUI comprising a second selector that is selectable to allow the fifth participant to converse audibly in the second video conference;
  responsive to selection of the first selector, allow the fifth participant to converse audibly in the first video conference; and
  responsive to selection of the second selector, allow the fifth participant to converse audibly in the second video conference;
  wherein the instructions are also executable to:
  based on input from one or more sensors, monitor the participation of the first, second, third and fourth participants in their respective video conferences; and
  based on the monitoring:
    present, on the GUI, the data related to the first topic that is to be discussed by the first and second participants of the first video conference; and
    concurrently present, on the GUI, the data related to the second topic that is to be discussed by the third and fourth participants of the second video conference.

20. The CRSM of claim 19, wherein the instructions are executable to:
  receive input from at least one microphone;
  execute natural language processing using the input from the at least one microphone; and
  monitor the participation of the first, second, third, and fourth participants in their respective video conferences based on the execution of the natural language processing using the input from the at least one microphone.

* * * * *